United States Patent Office 3,466,738
Patented Sept. 16, 1969

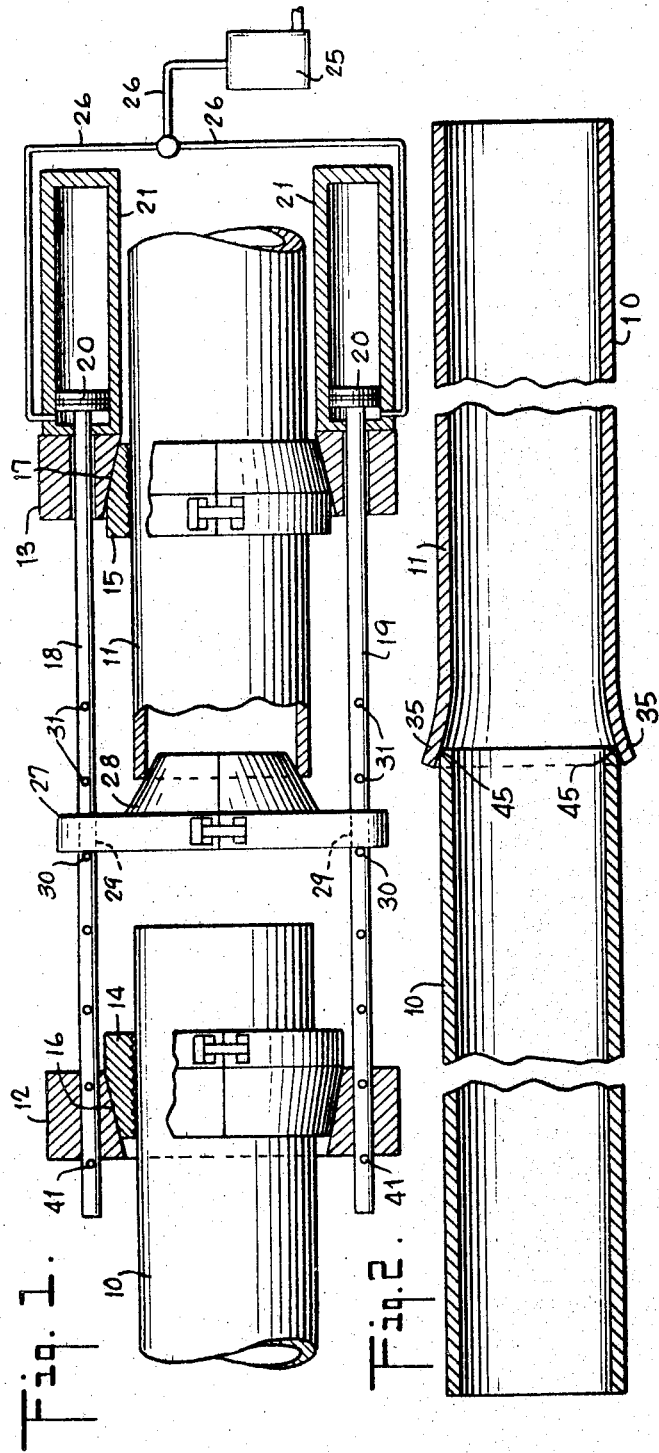

3,466,738
METHOD OF JOINING TUBES BY DRIVEN FORCE FIT AND JOINT PRODUCED THEREBY
Wadsworth W. Mount, Mountain Ave., Warren Township, Somerset County, N.J. 07060
Filed June 7, 1965, Ser. No. 461,983
Int. Cl. B23p *19/02;* F16l *19/00*
U.S. Cl. 29—525      3 Claims

ABSTRACT OF THE DISCLOSURE

This disclosure is directed to a method and apparatus for producing a press-fitted pipe joint whereby the outer pipe is elastically expanded during the pressing of the pipes together.

---

Pipe joints have hitherto been made between pipes in which a bell or socket is formed at one end of each pipe section and the opposite end of the adjacent pipe is inserted in the bell or socket. In order to produce a tight joint, packings of soft metal, asphaltic material or like substances have been introduced before the pipe sections are forced together. Alternately, the pipe sections are welded at the joint, and thus a tight joint is secured. Another example is found in the joints in the tube sections of vacuum cleaners. Here a bell with an internal diameter only slightly larger than the outside diameter of the section to which it is joined is utilized so that a close fitting joint results and the slight friction between the parts is sufficient to make the joint free from accidental separation of the pipe sections. In all such applications carefully controlled tolerances between the mating diameters are maintained.

My present invention has for one object the joining of pipe sections having comparatively thin walls relative to the diameter, which pipe sections may be of exactly equal nominal size and wall thickness and may be forced into overlapping engagement without subjecting either of the pipe sections at the joint to stresses in excess of the rupture limit of the steel of which the pipes are formed. The elasticity of the outer pipe at the joint makes an extremely tight joint, without reliance on predetermined tolerances, and may require many thousands of pounds to force the sections together and thereafter to pull apart, as hereinafter set forth. Furthermore, the complete joint retains almost exactly the same original inside diameter on the inside pipe, when two pipes are joined by this method.

Another object is to provide a new and satisfactory method of producing a friction pipe joint between parts of substantially equal size and thickness, the pipes being made of the same or of differing materials, in which the ultimate elastic limits of the pipe material used in the joint are not exceeded.

Another object is to provide a quickly-formed and inexpensive means of joining pipe sections, particularly on construction sites, without the necessity of using separate joint fittings or welding. By this means short sections of pipe may readily be connected into desired longer lengths, in some cases thereby effecting considerable savings.

The invention will be better understood by reference to the accompanying drawings, in which:

FIG. 1 is an elevation showing the adjacent ends of two pipes of the same size and wall thickness together with a hydraulically operated clutch mechanism for first forming a slight bell in the adjacent end of one pipe and then pulling the pipes together.

FIG. 2 is a sectional elevation of the two pipe sections as they are in position to be joined.

FIG. 3 is a view corresponding to FIG. 2 in which a pipe joint is completed between the pipe sections, one having been forced into the other.

Referring first to FIG. 1, steel pipe sections 10 and 11 are of equal size and wall thickness as produced in the pipe mill. Grip pipe rings 12 and 13 are mounted on the respective ends of the pipe sections 10 and 11 and have clutch rings 14 and 15 mounted within the rings 12 and 13 and adapted to be forced into gripping contact with the pipe by the frusto-conical or wedge surfaces 16 and 17 of the rings 12 and 13 when the rings are pulled toward each other in an axial direction.

Pull bars 18 and 19 extend through usual openings in the rings 12 and 13 and terminate in piston enlargements 20 at one end operating in hydraulic cylinders 21. A hydraulic pump 25 is connected by piping 26 to the inner ends of cylinders 21 so that when the pump 25 is operated the pistons 20 are forced away from the ring 13 and the bars 18 and 19 are put in tension.

A taper-forming ring 27 having a frusto-conical extension 28 is so mounted that the extension 28 enters the end of pipe section 11. The bars 18 and 19 project through suitable holes 29 in ring 27, and pins 30 are inserted in holes 31 in the bars 18 and 19.

The hydraulic pump is then operated to pull the taper-forming ring 27 with sufficient force to produce a slight bell or starting taper 35 in the end of pipe 11, as shown in FIG. 2.

The forming ring 27, which has a split-ring hinged construction, is then removed.

Pins 41 are then inserted in the bars 18 and 19 beyond the ring 12, and the hydraulic pump 25 is then actuated to pull the pipe sections together with great force.

The entering end of pipe section 10 is very slightly bent or swaged inward when the high pressure is first applied, as shown at 45, which helps to promote smooth, non-galling movement as the joint is completed.

While only two bars 18 and 19 are shown, several may be spaced circumferentially around the rings.

The details of the ring structures are well known in the petroleum oil industry and are shown as particularly suitable in view of the fact that axial pressures of from 40,000 pounds to 300,000 pounds may be required to produce the overlap necessary for many uses, and as great or even greater forces are required to pull the joint apart.

The length of the overlap is determined by the service to which the joint is applied. It may vary on steel A.P.I. line pipe as tested, for example, where an axial force of 48,000 pounds was required to produce a joint with a one inch overlap and 160,000 pounds force was required to produce an overlap of eight inches on 10¾" O.D. pipe having a ⅛" wall thickness. The axial length of the overlap should be of the same order of magnitude as the diameter of the pipe.

Larger pipe and pipe with heavier walls requires higher axial force to push the pipe sections together or to pull the joint apart after completion.

The outer pipe expands so that its final outside diameter, as shown in the drawing, is substantially equal to the sum of the original outside diameter of the inner pipe plus twice the wall thickness of the outer pipe elastically, while the inner pipe substantially holds its shape except for the slight swaging of the leading edge above referred to. Since the enlargement of the diameter of the outer pipe is created by force applied axially in forcing one pipe inside the other, the longer the overlap, the greater the elastic grip of the outer pipe on the inner pipe.

It has been found that comparatively thin walled steel pipe will have a greater arch strength than rim strength; in other words, it will stretch outward within its elastic limit more readily than it can be crushed in radially.

The pipe may be overlapped in forming the joint, a distance just short of where the pipes would fail in compression or tension at some point beyond the overlapped joint.

While a mechanism has been shown which is particularly adapted for field use in forcing the pipes together at the joint, other means such as hammering may be employed, but the best results are obtained when the pipes are kept in an axially aligned position.

If feasible, the slight starting taper 35 may be preformed in one end of each pipe at the mill, in which case the taper former 27 may be omitted. However, the force required to push or pull the two pipe sections together in the formation of the joint, as shown in FIG. 3, may be in the order of 270,000 pounds.

In accordance with this invention, I have discovered that thin wall pipe, as above described, has sufficient strength that the inner pipe of the joint will not be crushed and the outer pipe of the joint will be stretched only enough to let the inner pipe enter, and a radially highly compressed overlapped joint will result. Consequently, the joint does not need to be welded or otherwise secured, for most uses. In fact, it has been found that it takes close to the compression joint-forming force to pull the joint apart. The joint is therefore permanently satisfactory if desired, or it may be pulled apart and the pipe used again.

While the above described joint of this invention is particularly adapted for joining thin wall pipes which may originally be equal in nominal diameter and equal in nominal wall thickness, it is not so limited. For example, the inner pipe of the joint may have the thicker wall provided the rupture limit of the wall of the outer pipe is not exceeded. It will be understood that the pipes embodying the above described joint may have very wide applicability to the requirements of architects, builders and contractors.

The pipe joints of this invention are extremely tight without resorting to welding or interposing any asphaltic substance into the joint.

As above explained, the outer pipe is stretched at the joint, but its elasticity is retained so that the outer pipe very strongly compresses the inner pipe, and this is an important factor in producing the joint of this invention as contrasted with prior art joints. Because of these effects, wide tolerances between the pipes to be overlapped may exist and tight, strong joints still result by this method.

It will be understood that the means for forcing the pipe sections together, as shown in FIG. 1 of the drawings, is indicative of any suitable means and only such limitations should be imposed as are indicated in the appended claims.

As above stated, wide tolerances are permitted in the production of this joint, provided only that the original outside diameter of the inside pipe is greater than the original inside diameter of the outside pipe before the joint is made, and the starting flare or bell is at least large enough so that the inside pipe can enter the inside of the outer pipe.

I claim:
1. The method of coupling two elastically deformable metal pipe sections, each section having an unstressed internal diameter substantially less than the external diameter of the other section, including the steps of:
 (a) flaring one end of one pipe section so that its internal diameter at the flared end is greater than the external diameter of an unflared end of the other pipe section;
wherein the improvement comprises the step of:
 (b) forcing an unflared end of the other pipe section into said flared end until the sections are overlapping for a substantial length, so that only the tip of the unflared pipe is contracted slightly while the remainder of the overlapped portion of the inner pipe retains substantially its original inside diameter, and the overlapping portion of said one section elastically expands substantially to accommodate said other pipe section, and the overlapped portions engage and hold one another tightly.

2. The method of claim 1, wherein said forcing step is continued until said overlap extends axially of said pipe sections for a distance substantially equal to one diameter.

3. The method of claim 1, wherein the overlapping portion of the outer pipe expands to an outer diameter substantially equal to the original outside diameter of the inner pipe plus twice the wall thickness of the outer pipe.

References Cited

UNITED STATES PATENTS

| 220,322 | 10/1879 | Wiley. |
| 2,267,339 | 12/1941 | Paulsen. |
| 3,217,400 | 11/1965 | Illesy et al. |

FOREIGN PATENTS

| 435,700 | 9/1935 | Great Britain. |
| 596,135 | 12/1947 | Great Britain. |

CHARLIE T. MOON, Primary Examiner

U.S. Cl. X.R.
29—237; 285—18, 382.4